J. E. BLODGETT.
Wagon-Brake.
No. 12,539.  Patented Mar. 20, 1855.
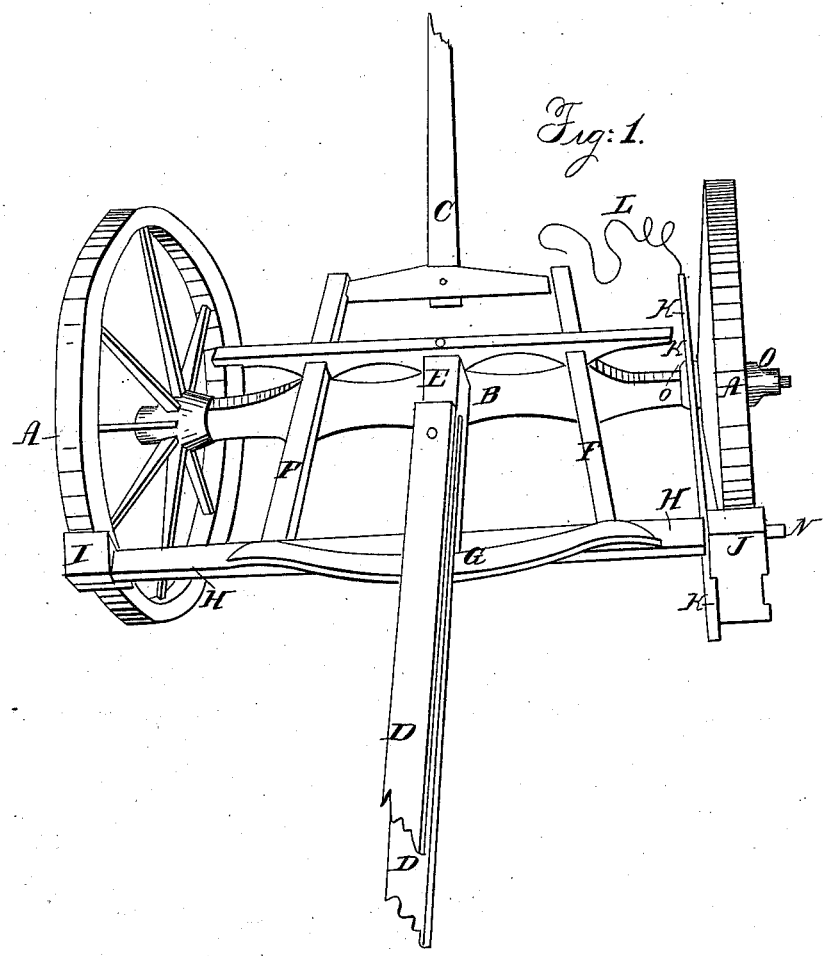
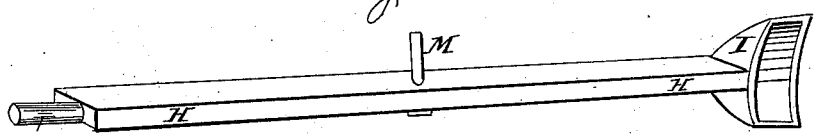
Witnesses.  Inventor
Robt H Martin  Jehial E Blodgett
H K Thurber

UNITED STATES PATENT OFFICE.

J. E. BLODGETT, OF HANNIBAL, NEW YORK.

WAGON-BRAKE.

Specification of Letters Patent No. 12,539, dated March 20, 1855.

*To all whom it may concern:*

Be it known that I, JEHIAL E. BLODGETT, of Hannibal, in the county of Oswego and State of New York, have invented certain new and useful Improvements in the Construction and Application of Wagon-Brakes; and I do hereby declare that the following is a full, clear, and exact description of the construction and operation of the same, reference being had to the accompanying drawings, making a part of this specification, in which—

Figure 1 is a perspective view. Fig. 2 a sectional drawing of the brake. Fig. 3 a view of the turning pad by which the brake is tightened.

A, A, front wheels of a wagon, B front axle, C the tongue, D the reaches, E the block tongue, F, F, the hounds, G the sway bar, all of which I construct in the usual manner. The hounds and block tongue I let run back little farther than the back part of the front wheels, so as to receive the brake, or, lengthen them if too short by attaching something for that purpose, H, H, main bar of the brake, which I construct of sufficient length to receive both pads as they bear against the wheels, one pad being attached to each end; I one of the pads to bear against one of the wheels, it is firmly attached to one end of the main bar of the brake.

M is a bolt, or other attachment, to fasten the main bar to the wagon, and upon which the main bar turns back and forth.

J is the turning pad, working usually upon a pin N, such turning pad I construct of such form, as to bear again the wheel on being turned partly around, and to bear harder on being turned farther, such pad I usually turn by means of a lever or handle K, firmly bolted either upon the in, or out side of the pad J, and running forward upon the hub O, either in, or out side of the main part of the wheel. As the form of the loading shall dictate as most convenient, the lever K is worked by means of the rope or strap L, which runs upon the load to the teamster however high the load may be. To use the brake, pull the strap L, which raises the lever K, turning the pad J, against the wheel, also crowding back that end of the main bar, which by turning upon its attachment M, throws the other end forward with its pad I, against the other wheel, thus making the effect upon each wheel as nearly the same as possible.

I do not claim the originating of the idea, of wagon brake, or their invention. I hereby disclaim such invention, claiming only certain new and useful improvements in the construction and application of wagon brakes as herein described, thus rendering them perfectly effectual and applicable to nearly all kinds of loading.

What I claim as my invention, and desire to secure by Letters Patent is—

The application of wagon brakes to the forward wheels of wagons, by using the hounds, sway bar, block tongue, or other appendages running back from and firmly attached to the front axle, as the frame for the support and steadying of such brakes, also the construction of a brake, so light, and simple, as to admit of being supported by such frame, such brake having a main bar of sufficient length to receive both pads, said main bar turning upon its fastening at or near its center, with the pad for one wheel firmly attached to one end, and the pad for the other wheel so attached to the other end of the main bar, as to turn on such attachment or fastening, such turning pad, to be of such form, as to bear against its wheel on being turned partly around, and to bear harder on being turned farther, and at the same time, by crowding back that end of the main bar to which it is attached, to throw the other end with its pad against the other wheel as above described.

JEHIAL E. BLODGETT.

Witnesses:
D. H. DAVIS,
H. K. THURBER.